United States Patent
Murata et al.

(10) Patent No.: US 8,459,408 B2
(45) Date of Patent: Jun. 11, 2013

(54) RADIATED SOUND REDUCING STRUCTURE

(75) Inventors: Toshio Murata, Toyota (JP); Hideyuki Kohmitsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/388,394

(22) PCT Filed: Aug. 20, 2010

(86) PCT No.: PCT/IB2010/002064
§ 371 (c)(1),
(2), (4) Date: Feb. 1, 2012

(87) PCT Pub. No.: WO2011/117667
PCT Pub. Date: Sep. 29, 2011

(65) Prior Publication Data
US 2012/0138383 A1    Jun. 7, 2012

(30) Foreign Application Priority Data
Aug. 21, 2009  (JP) ................................. 2009-192293

(51) Int. Cl.
*F01N 13/08*   (2010.01)
(52) U.S. Cl.
USPC ........... 181/228; 181/227; 181/212; 181/274; 181/280
(58) Field of Classification Search
USPC .................. 181/212, 274, 279, 280, 227, 228
See application file for complete search history.

(56) References Cited

U.S. PATENT DOCUMENTS

| | | | | |
|---|---|---|---|---|
| 3,235,003 | A * | 2/1966 | Smith | 165/135 |
| 3,746,126 | A * | 7/1973 | de Cardenas | 181/227 |
| 4,050,539 | A * | 9/1977 | Kashiwara et al. | 181/280 |
| 4,109,754 | A | 8/1978 | Purhonen | |
| 4,530,418 | A * | 7/1985 | Currie | 181/227 |
| 4,993,512 | A * | 2/1991 | Lescher | 181/227 |
| 5,901,754 | A * | 5/1999 | Elsasser et al. | 138/118 |

(Continued)

FOREIGN PATENT DOCUMENTS

| | | |
|---|---|---|
| DE | 27 01 830 A1 | 7/1977 |
| DE | 10 2004 029 2 | 1/2006 |

(Continued)

OTHER PUBLICATIONS

Tanizawa et al., "Stress Analysis of a Concave Polyhedral Shell," *Institute of Space and Aeronautical Science, University of Tokyo*, Report No. 523, pp. 39-60, Mar. 1975.

(Continued)

*Primary Examiner* — Forrest M Phillips
(74) *Attorney, Agent, or Firm* — Oliff & Berridge, PLC

(57) ABSTRACT

A radiated sound reducing structure that reduces radiated sound generated in a pipe through which gas passes includes a first pipe and a second pipe that is arranged inside the first pipe and has, on an outer peripheral surface, a linear contact portion that is in linear contact with a portion of an inner peripheral surface of the first pipe. Also, a radiated sound reducing structure in a pipe through which gas passes includes a first pipe and a second pipe formed in a pseudo-cylindrical concave polyhedral shell that is arranged inside the first pipe and has, on an outer peripheral surface, a point contact portion, that is in point contact with a portion of the inner peripheral surface of the first pipe.

19 Claims, 18 Drawing Sheets

U.S. PATENT DOCUMENTS

| | | | |
|---|---|---|---|
| 6,220,387 B1 * | 4/2001 | Hoppes et al. | 181/259 |
| 6,364,055 B1 * | 4/2002 | Purdy | 181/279 |
| 2002/0185334 A1 * | 12/2002 | Kim | 181/279 |
| 2005/0161283 A1 | 7/2005 | Emler | |
| 2007/0295554 A1 | 12/2007 | Flucht et al. | |
| 2012/0055733 A1 * | 3/2012 | Wheeler | 181/212 |

FOREIGN PATENT DOCUMENTS

| | | |
|---|---|---|
| DE | 10 2008 019 8 | 11/2008 |
| DE | 102008019833 * | 11/2008 |
| FR | 2 620 169 A1 | 3/1989 |
| JP | U-50-096809 | 8/1975 |
| JP | U-51-047057 | 4/1976 |
| JP | U-52-102510 | 8/1977 |
| JP | U-52-125644 | 9/1977 |
| JP | A-57-051083 | 3/1982 |
| JP | A-57-204420 | 12/1982 |
| JP | U-57-204420 | 12/1982 |
| JP | U-59-039724 | 3/1984 |
| JP | A-61-065982 | 4/1986 |
| JP | A-11-216210 | 8/1999 |
| JP | A-2001-317350 | 11/2001 |
| JP | A-2002-284032 | 10/2002 |
| JP | A-2003-138931 | 5/2003 |
| JP | A-2005-180270 | 7/2005 |
| JP | A-2007-154694 | 6/2007 |
| JP | A-2007-239465 | 9/2007 |

OTHER PUBLICATIONS

Miura, Koryo, "Proposition of Pseudo-Cylindrical Concave Polyhedral Shells," *Institute of Space and Aeronautical Science, University of Tokyo*, Report No. 442, pp. 141-163, Nov. 1969.

Japanese Office Action issued in Application No. 2009-192293; Dated Jun. 17, 2011 (With Translation).

International Preliminary Report on Patentability issued in Application No. PCT/IB2010/002064; Dated Nov. 14, 2011.

International Search Report issued in Application No. PCT/IB2010/002064; Dated Dec. 17, 2010.

* cited by examiner

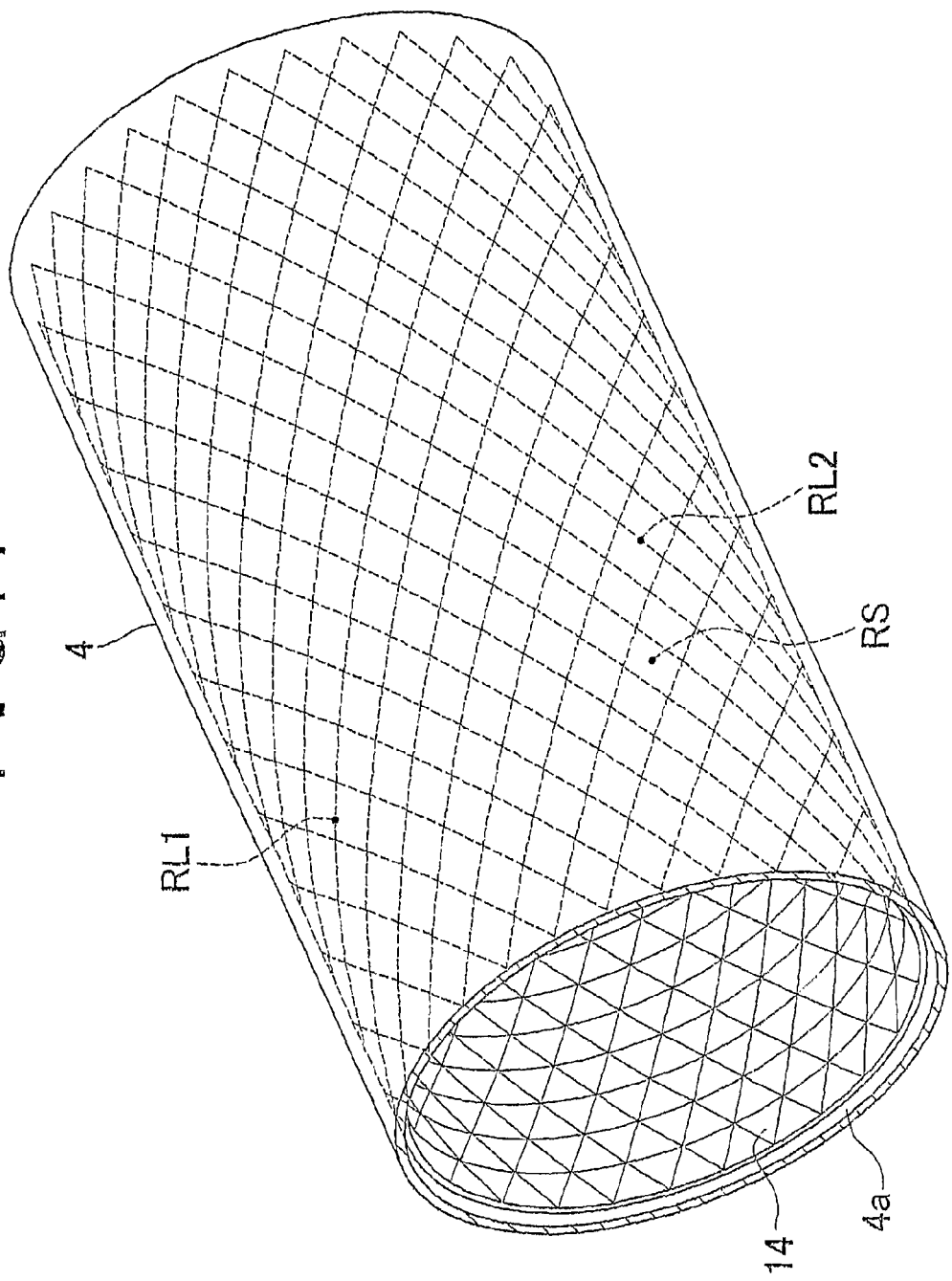

RADIATED SOUND REDUCING STRUCTURE

BACKGROUND OF THE INVENTION

1. Field of the Invention

The invention relates to a radiated sound reducing structure that reduces radiated sound generated in a pipe through which gas passes.

2. Description of the Related Art

Technology is known that reduces radiated sound in an exhaust system of an internal combustion engine by increasing the rigidity by using a multi-layered pipe for the exhaust passage, or damping exhaust vibration by interlaminar friction.

Japanese Patent Application Publication No. 2007-239465 (JP-A-2007-239465) (page 8, FIG. 1), for example, describes technology that reduces radiated sound by inhibiting vibration from being transmitted through a partition wall, that is formed by a lateral divider that divides the inside. of a shell of a muffler for a vehicle, by increasing the rigidity of the partition wall by using a reinforcing plate to make the partition wall a double partition wall.

Japanese Patent Application Publication No. 61-65982 (JP-A-61-65982) (page 3, FIG. 2), for example, describes technology that reduces radiated sound by making an exhaust pipe of an internal combustion engine a double pipe formed of an inner pipe and an outer pipe, and then creating a gap by interposing metal mesh between those. pipes. Also, Japanese Patent Application Publication No. 2007-154694 (JP-A-2007-154694) (pages 4 and 5, FIGS. 2 and 3), for example, achieves a sound reducing effect and a heat insulating effect by making an exhaust pipe of an internal combustion engine a double pipe formed of an inner pipe and an outer pipe, and then providing a space between the inner pipe and the outer pipe by forming protruding portions on the outer periphery of the inner pipe. In addition, thermal stress is mitigated by elastic deformation of the protruding portions.

With JP-A-2007-239465, the rigidity of the partition wall is increased by making the partition wall a double partition wall. However, with this method, multiple partition walls and reinforcing plates must be fixed inside the shell so the structure becomes complex and productivity is low. Moreover, the weight of the vehicle muffler increases, which is a disadvantage for making the vehicle lightweight.

With JP-A-61-65982, it is necessary to provide a gap by the metal mesh between the outer pipe and the inner pipe, so the productivity is low with this kind of complex triple layer structure. Moreover, the weight of the muffler increases, which is a disadvantage for making the vehicle lightweight.

With JP-A-2007-154694, the protruding portions of the inner pipe are in point contact with the inner surface of the outer pipe. Therefore, although this structure may be effective for preventing vibration from being transmitted from the rigid inner pipe to the rigid outer pipe by the flexible deformation of the protruding portions themselves, there is absolutely no vibration dampening effect from sliding between the inner pipe and the outer pipe. Therefore, a sufficient radiated sound reducing effect cannot be expected.

SUMMARY OF INVENTION

The invention provides a radiated sound reducing structure that a sufficient radiated sound reducing effect from sliding with a simple structure in a pipe through which gas passes.

A first aspect of the invention, relates to a radiated sound reducing structure that reduces radiated sound generated in a pipe through which gas flows, that includes a first pipe and a second pipe that is arranged inside of the first pipe and has a linear contact portion that is in linear contact with a portion of an inner peripheral surface of the first pipe.

According to the radiated sound reducing structure of this aspect, the outer peripheral surface of the second pipe contacts the inner peripheral surface of the first pipe at only a portion, instead of over the entire surface. Therefore, sliding easily occurs between the first pipe and the second pipe following oscillation of the second pipe due to pressure oscillation of the gas. Furthermore, the outer peripheral surface of the second pipe and the inner peripheral surface of the first pipe contact each other at a linear contact portion, so contact is stable and stronger friction is able to be generated.

The pressure oscillation of the gas is absorbed by being efficiently converted into heat energy by the sliding with this kind of strong friction. As a result, a large radiated sound reducing effect is realized. In this way, a sufficient radiated sound reducing effect from sliding can be realized with a simple structure in which a second pipe is arranged inside of a first pipe, with a portion of that second pipe being in linear contact with the inside of the first pipe.

In the radiated sound reducing structure according to the first aspect, the second pipe may also have, on an outer peripheral surface, a point contact portion that is in point contact with a portion of the inner peripheral surface of the first pipe.

In this way, the outer peripheral surface of the second pipe may contact the inner peripheral surface of the first pipe in a state in which the linear contact portion and the point contact portion are mixed. According to this structure, adding the point contact portion to the structure in the first aspect reinforces the contact between the first pipe and the second pipe, and thus makes the contact even more stable such that strong friction is generated.

Therefore, the pressure oscillation of the gas is absorbed by being efficiently converted into heat energy by the sliding that follows this kind of strong friction. As a result, a large radiated sound reducing effect is realized. In this way, a sufficient radiated sound reducing effect from sliding can be realized with a simple structure in which a second pipe is arranged inside of a first pipe, with a portion of that second pipe being in linear contact and point contact with the inside of the first pipe.

In the radiated sound reducing structure described above, the inner peripheral surface of the first pipe, may be a circular cylindrical surface, and the linear contact portion or the point contact portion may be a convex portion that is formed on the outer peripheral surface of the second pipe.

With a combination of this kind of circular cylindrical inner peripheral surface of the first pipe and the convex portion of the second pipe, linear contact between both of those, or contact in which linear contact and point contact are mixed, can be realized, so sliding between the circular cylindrical inner peripheral portion and the convex portion of the second pipe with strong friction is possible. Accordingly, a sufficient radiated sound reducing effect from sliding can be realized with a simple structure.

In the radiated sound reducing structure described above, the linear contact portion may include a helical contact portion that extends in a helical shape in the axial direction of the first pipe.

Having the linear contact portion include a linear contact portion that extends in a helical shape in this way stabilizes the contact between the first pipe and the second pipe, and enables sufficient sliding to occur between the first pipe and the second pipe following oscillation in the axial direction and oscillation in the circumferential direction. As a result, it is possible to effectively convert oscillation into heat and realize a sufficient radiated sound reducing effect from sliding with a simple structure.

In the radiated sound reducing structure described above, the linear contact portion may include two of the helical contact portions that twist in opposite directions in the axial direction of the first pipe and intersect one another.

Having the linear contact portion include two helical contact portions that intersect one another in this way further stabilizes the contact between the first pipe and the second pipe, and more effectively increases sliding between the first pipe and the second pipe, which in return makes it possible to effectively convert oscillation into heat such that a sufficient radiated sound reducing effect from sliding is able to be realized. Further, the two helical contact portions that intersect one another between the first pipe and the second pipe create multiple spaces that are either completely or partially separated. As a result, when membrane oscillation is generated in the second pipe, the oscillation energy is consumed by the volume fluctuation of these spaces, so an even greater radiated sound reducing effect can be realized.

In the radiated sound reducing structure described above, the linear contact portion may include a mesh-shaped contact portion.

Having the linear contact portion include a mesh-shaped contact portion in this way makes it possible to enable sufficient sliding to occur between the first pipe and the second pipe following various types of oscillation such as axial oscillation and circumferential oscillation. Accordingly, oscillation is able to be effectively converted into heat, so a sufficient radiated sound reducing effect from sliding can be realized. Furthermore, multiple spaces that are separated by the mesh-shaped contact portion are formed between the first pipe and the second pipe, so when membrane oscillation is generated in the second pipe, the oscillation energy is consumed by the volume fluctuation of these spaces, so an even greater radiated sound reducing effect can be realized.

In the radiated sound reducing structure described above, the second pipe may be formed in a polyhedron, and the linear contact portion may be an edge of the polyhedron.

Forming the second pipe in a polyhedron makes it possible to distribute the convex apexes or edges (i.e., the sides of faces that forms the polyhedron) over the entire surface of the second pipe. The apexes or edges of the second pipe are then able to be placed in contact with the inner peripheral surface of the first pipe by arranging this second pipe inside the first pipe.

The shapes of the edges between the faces that form the polyhedron are normally initially straight. Therefore, when the polyhedron is fit into the first pipe, the apexes normally contact the inner peripheral surface of the first pipe and form point contact portions. However, arranging the second pipe inside the first pipe with the edges bent along the inner peripheral surface of the first pipe places the edges of the polyhedron in contact with the inner peripheral surface of the first pipe such that sliding is possible with sufficiently strong friction force.

Moreover, because, the second pipe is a polyhedron, the multiple spaces that are formed by the concavo-convex outer peripheral surface of the second pipe are widely dispersed all over between the second pipe and the first pipe. Accordingly, when membrane oscillation is generated in the second pipe, the oscillation energy is consumed by the volume fluctuation of these spaces, so an even greater radiated sound reducing effect can be realized. In addition, the polyhedron can also be easily formed, so the productivity is even higher.

In the radiated sound reducing structure described above, the second pipe may be formed in a polyhedron by forming folds in a circular cylindrical member.

A circular cylindrical member can be easily manufactured. Furthermore, a polyhedral second pipe can easily be manufactured from this kind of circular cylindrical member by forming folds in it. Accordingly, the productivity of the second pipe increases, so the productivity of the radiated sound reducing structure also increases.

In the radiated sound reducing structure described above, the polyhedron may be a pseudo-cylindrical concave polyhedral shell.

Placing the convex apexes or edges, from among apexes and edges of this kind of pseudo-cylindrical concave polyhedral shell, in contact with the inner peripheral surface of the first pipe makes it possible to realize linear contact and point contact in which sliding is possible with a sufficiently strong friction force.

Moreover, as described above, the multiple spaces are widely dispersed all over between the first pipe and the second pipe, so a sufficiently high radiated sound reducing effect can be realized. Furthermore, it is easy to form the pseudo-cylindrical concave polyhedral shell from a circular cylindrical member, so the productivity of the second pipe is even higher.

In the radiated sound reducing structure according to the first aspect described above, the second pipe may be formed in a bellows shape, and the linear contact portion may extend in a ring shape around an axis.

Sufficient friction sliding is able to occur between the first pipe and the second pipe by having the bellows-shaped second pipe contact the first pipe at the ring-shaped linear contact portion. In this way, oscillation is effectively converted into heat, so a sufficient radiated sound reducing effect from sliding is able to be realized. Further, multiple spaces that are separated in the axial direction by the ring-shaped linear contact portion are formed between the first pipe and the second pipe, so when membrane oscillation occurs in the second pipe, the oscillation energy is consumed by the volume fluctuation of these spaces, so an even greater radiated sound reducing effect can be realized.

A second aspect of the invention relates to a radiated sound reducing structure that reduces radiated sound generated in a pipe through which gas flows, that includes a first pipe and a second pipe formed in a polyhedron that is arranged inside of the first pipe and has a contact portion that contacts a portion of an inner peripheral surface of the first pipe.

Similar to the first aspect, the radiated sound reducing structure of this second aspect is also able to realize a sufficient radiated sound reducing effect from sliding with a simple structure in which a polyhedral second pipe is arranged inside a first pipe, with a portion of the second pipe contacting the inside of the first pipe. Also, in the radiated sound reducing structure according to this second aspect of the invention, the polyhedron may be a pseudo-cylindrical concave polyhedral shell.

A third aspect of the invention relates to a radiated sound reducing structure in a pipe through which gas passes, that includes a first pipe and a second pipe formed in a pseudo-cylindrical concave polyhedral shell that is arranged inside of the first pipe and has, on an outer peripheral surface, a point contact portion that is in point contact with a portion of an inner peripheral surface of the first pipe.

With the radiated sound reducing structure according to this third aspect, the outer peripheral surface of the second pipe contacts the inner peripheral surface of the first pipe at only a portion, instead of over the entire surface. Therefore, sliding occurs easily between the first pipe and the second pipe following oscillation of the second pipe due to pressure oscillation of the gas. Furthermore, the point contact portion is distributed over the entire inner peripheral surface of the first pipe because the second pipe is a pseudo-cylindrical concave polyhedral shell. As a result, the contact between the first pipe and the second pipe is stable so strong friction can be generated.

The pressure oscillation of the gas is absorbed by being efficiently converted into heat energy by sliding that follows this kind of strong friction, so a large radiated sound reducing effect is realized. In addition, the area covered by these spaces between the second pipe and the first pipe is large so oscillation is not easily transmitted from the second pipe to the first pipe.

In this way, a sufficient radiated sound reducing effect from sliding can be realized with a simple structure in which a second pipe formed in a pseudo-cylindrical concave polyhedral shell is arranged inside a first pipe, with a portion in point contact with the inside of the first pipe.

In the radiated sound reducing structure according to the third aspect, the second pipe may be formed in a pseudo-cylindrical concave polyhedral shell by forming folds in a circular cylindrical member.

A circular cylindrical member can be easily manufactured. Further, a second pipe of a pseudo-cylindrical concave polyhedral shell can also be easily manufactured from a circular cylindrical member by forming folds in the circular cylindrical member. Accordingly, productivity of the second pipe is increased, so the productivity of the radiated sound reducing structure is also increased.

In the radiated sound reducing structure described above, the gas that passes through the pipe may be exhaust gas from an internal combustion engine.

In this way, by using the structure described above in an exhaust passage of an internal combustion engine, a sufficient radiated sound reducing effect from sliding in the pipe serves as an exhaust pipe through which exhaust gas passes can be realized with a simple structure Thus, this structure improves the productivity of the internal combustion engine and also helps to make the internal combustion engine lightweight.

BRIEF DESCRIPTION OF DRAWINGS

The foregoing and further objects, features. and advantages of the invention will become apparent from the following description of example embodiments with reference to the accompanying drawings, wherein like numerals are used to represent like elements and wherein:

FIG. 7 is a view of the linear contact between the inner pipe and the, outer pipe according to the first example embodiment;

DETAILED DESCRIPTION OF EMBODIMENTS

Figure 1A:
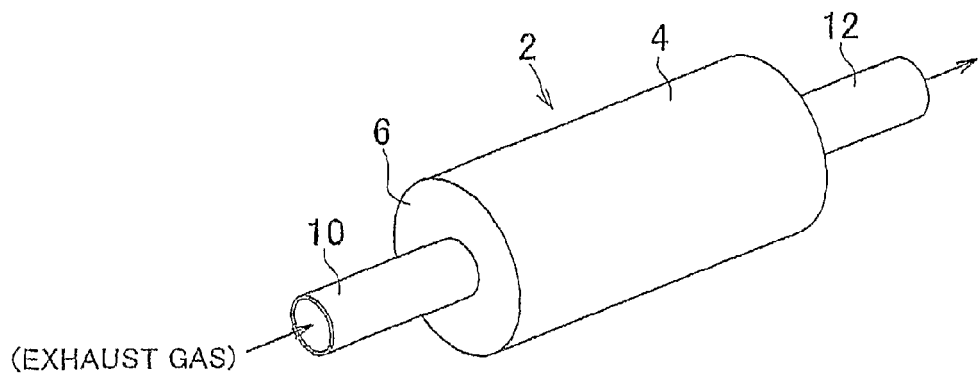
FIGS. 1A to 1C are views of the structure of a muffler according to a first example embodiment of the invention.
Figure 1B:
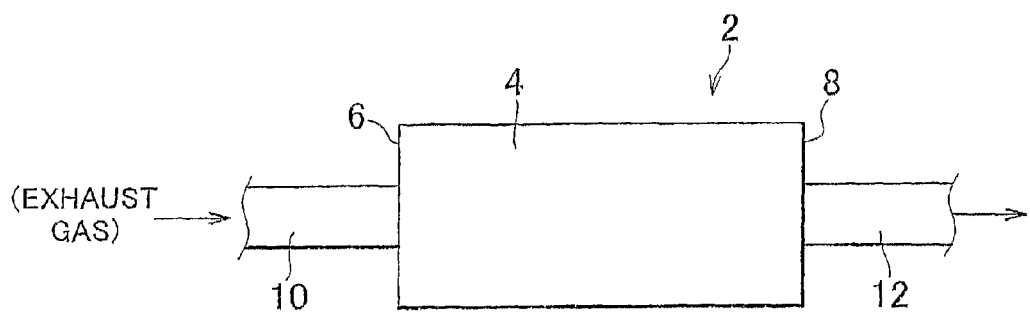
Figure 1C:
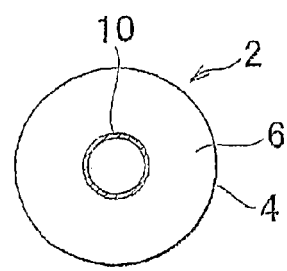

Hereinafter, a first example embodiment of the invention will be described. FIGS. 1A to 1C are views of the main portions of a muffler 2 to which the invention described above has been applied. FIG 1A is a perspective view of the muffler 2, FIG. 1B is a front view of the muffler 2, and FIG. 1C is a left side view of the Muffler 2. The outer surface of the muffler 2 is formed from a circular cylindrical outer pipe 4 and end plates 6 and 8 that cover both ends of this outer pipe 4. A gas intake pipe 10 is attached to one end plate 6 and a gas discharge pipe 12 is attached to the other end plate 8. Gas enters the muffler 2 through the gas intake pipe 10, passes through the muffler 2, and is then discharged from the gas discharge pipe 12.

Figure 2A:
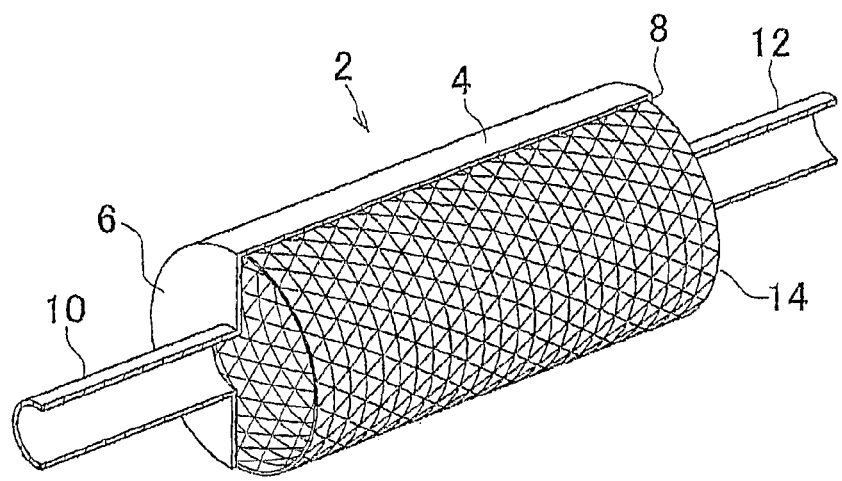
FIGS. 2A and 2B are partially cut-away views of the muffler in the first example embodiment.
Figure 2B:
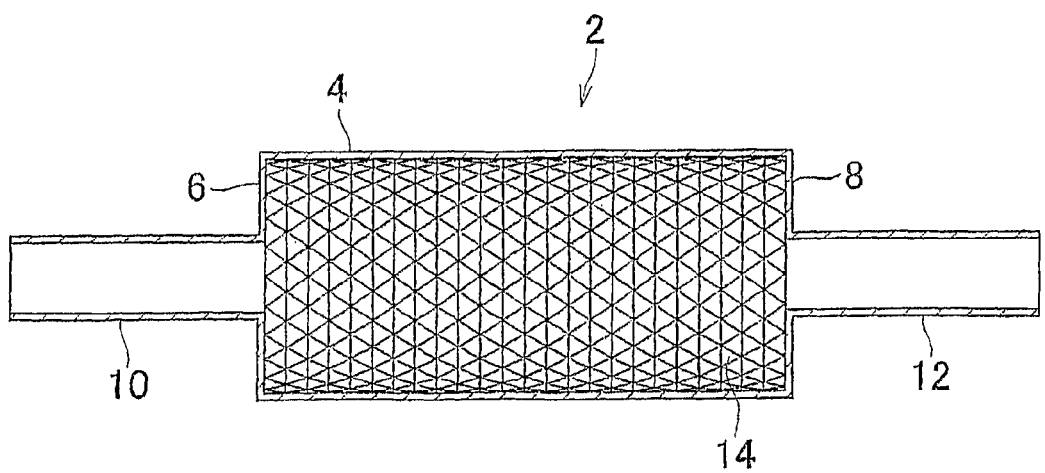
Figure 3:
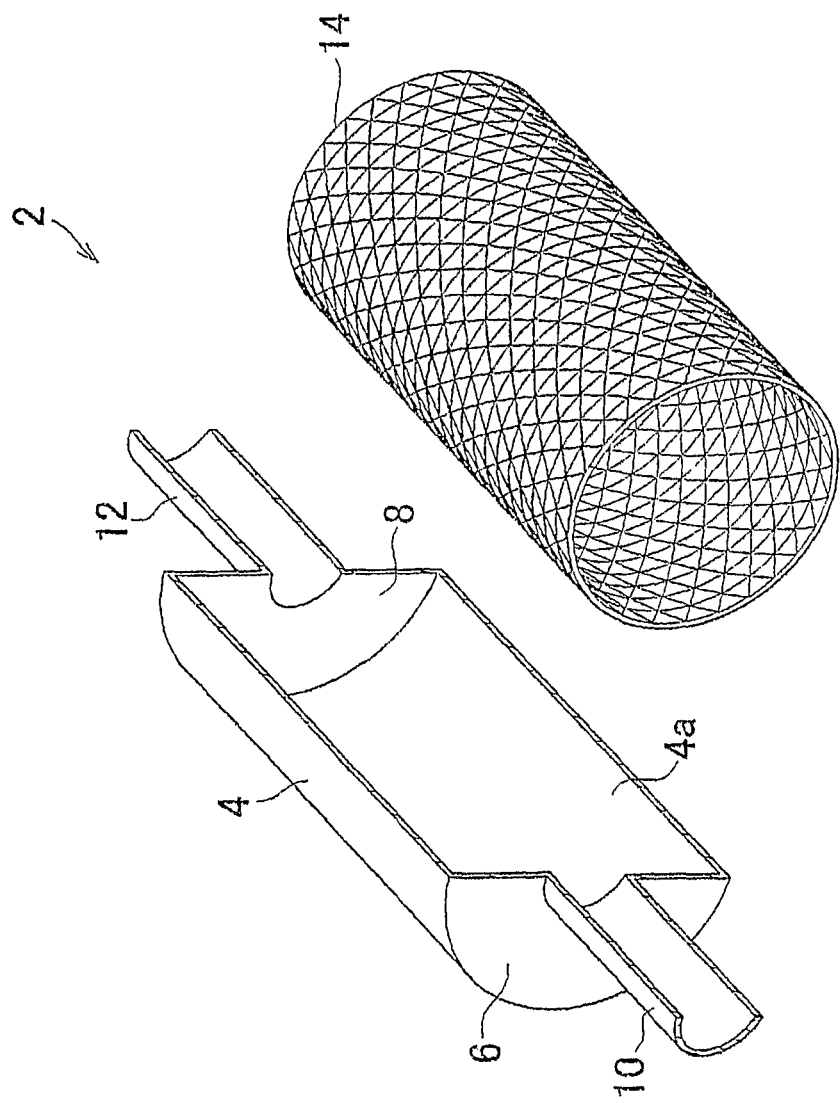
FIG. 3 is an exploded view of the structure in FIGS. 2A and 2B.
Figure 4A:
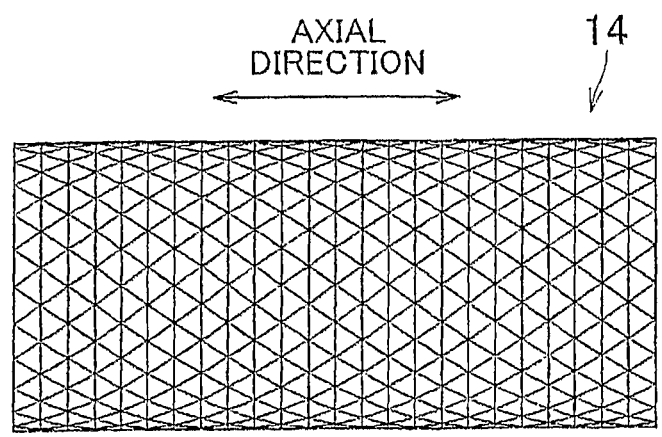
FIGS. 4A and 4B are views of the structure of a inner pipe according to the first example embodiment.
Figure 4B:
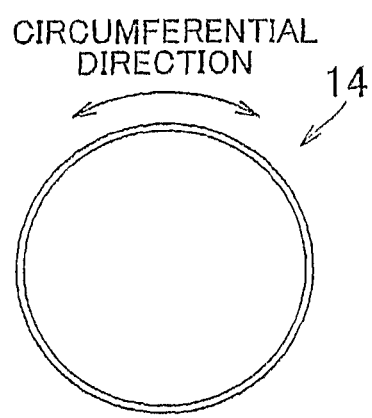

FIGS. 2A and 2B are views of the inside of the muffler 2. FIG. 2A is a perspective view of the muffler 2 traversing longitudinally through the outer surface, and FIG. 2B is a front view of the muffler 2 with the outer surface cut away longitudinally. FIG. 3 is an exploded perspective view of the structure shown in FIGS. 2A and 2B, A inner pipe 14 that contacts the inner, peripheral surface 4a of the outer pipe 4 is arranged inside the outer pipe 4. This inner pipe 14 is formed in a so-called pseudo-cylindrical concave polyhedral shell (PCCP shell) in which the outer peripheral surface is a polyhedron and the overall shape is pseudo-cylindrical, as shown in the front view of FIG. 4A and the left side view of FIG. 4B. This PCCP shell corresponds to a polyhedron shaped by combinations of triangular faces or trapezoidal faces with concavo-convex folds as the sides. FIGS. 2A to 4B show examples of the PCCP shell formed by combinations of triangles.

Figure 5:
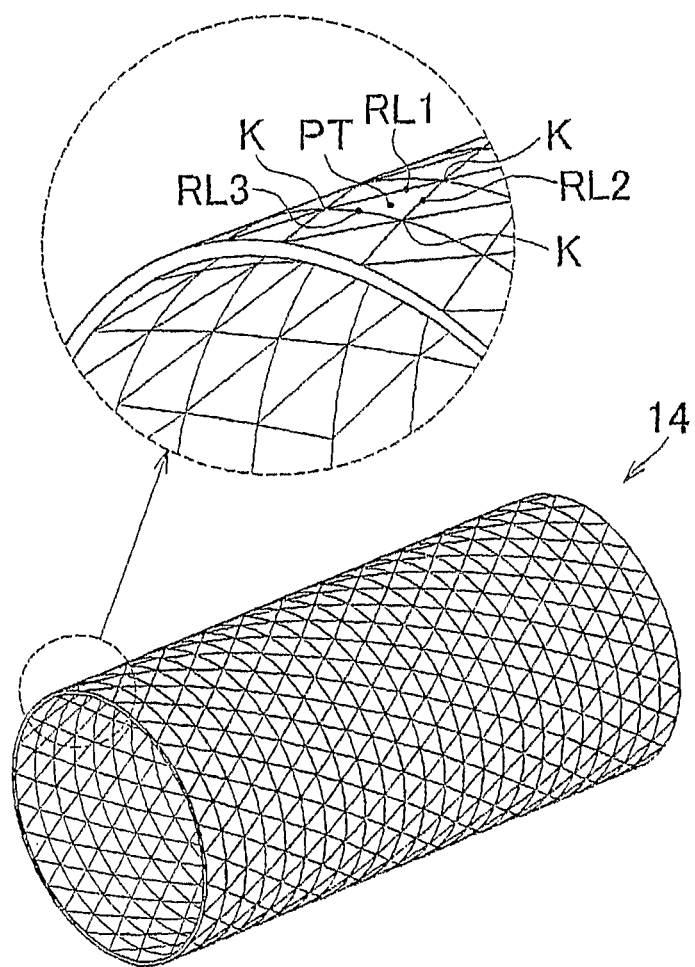
FIG. 5 is a partial enlarged sectional view of the inner pipe according to the first example embodiment.

With the inner pipe 14 formed in the PCCP shell, triangular faces PT are surrounded by three edges (i.e., three sides of the triangular face PT) RL1, RL2, and RL3 that are formed as folds, as shown by the enlarged view in FIG. 5. A pseudo-cylindrical shape is created by forming the peripheral surface with these kinds of triangular faces PT.

Of these three edges RL1, RL2, and RL3, two edges RL1 and RL2 are arranged and aligned extending in a helical shape in the axial direction of the inner pipe 14. These edges RL1 and RL2 are convex portions in which the interplanar angle of the two triangular faces PT adjacent to the edges RL1 and RL2 is greater than 180°.

The remaining edge RL3 is arranged and aligned extending in the circumferential direction, and extends in a ring shape around the inner pipe 14. This edge. RL3 is a concave portion in which the interplanar angle of the two triangular faces PT adjacent to the edge RL3 is less than 180°.

In this inner pipe 14, the portions farthest from the axis of the inner pipe 14 in the radial direction are the two edges RL1 and RL2 that are arranged in a helical manner, and when the inner pipe 14 is not bent, the apex K where the edge RL1 and the edge RL2 intersect.

Figure 6A:
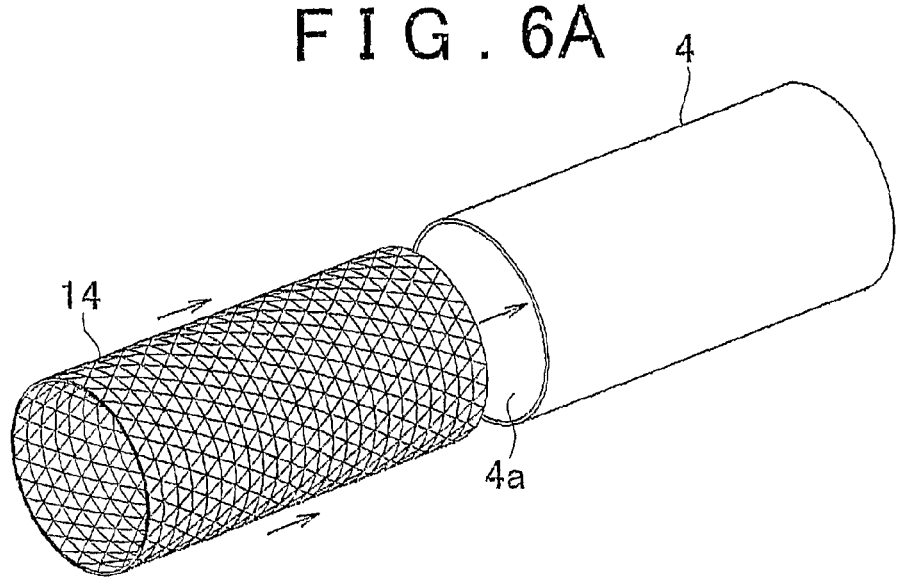
FIGS. 6A to 6C are views illustrating steps for fitting the inner pipe and the outer pipe together according to the first example embodiment.
Figure 6B:
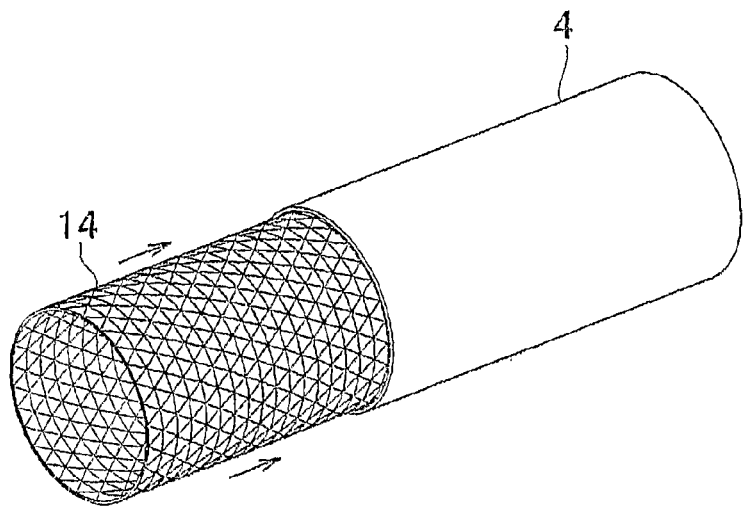
Figure 6C:
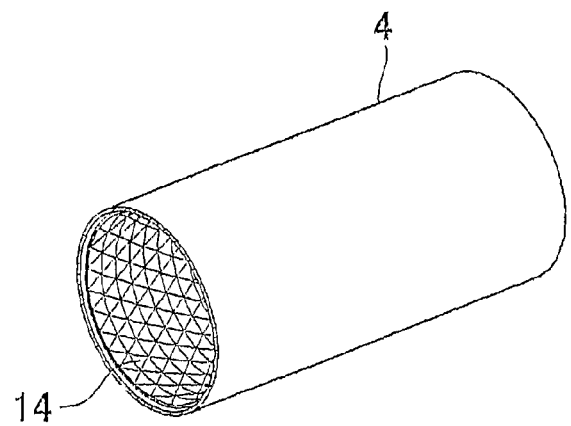

The inner pipe 14 of this kind of PCCP shell is installed by being fitted into the outer pipe 4 before the end plates 6 and 8 have been attached, as shown by the processes in FIGS. 6A to 6C. The dimensional relationship between the outer pipe 4 and the inner pipe 14 is such that the diameter of the portion where the apex K, which is where the edge RL1 and the edge RL2 intersect, is located is slightly larger, than the diameter of the inner peripheral surface 4a of the outer pipe 4. Alternatively, the diameter of the portion where the edges RL1 and RL2 is located may be slightly larger than the diameter of the inner peripheral surface 4a of the outer pipe 4. Therefore, the inner pipe 14 can be fitted inside the outer pipe 4 by thermal insertion which is done by heating the outer pipe 4.

When the outer pipe 4 and the inner pipe 14 reach the same temperature after the inner pipe 14 has been fitted inside the outer pipe 4 in this way, the inner pipe 14 forcefully presses against the inner peripheral surface 4a of the outer pipe 4 and the inner pipe 14 itself bends such that almost the entire lengths of the two edges RL1 and RL2, the convex portions, abut against. the inner peripheral surface 4a of the outer pipe 4. Accordingly, the two linear contact portions that twist in opposite directions in the axial direction of the outer pipe 4 and intersect one another are formed between the inner pipe 14 and the outer pipe 4, as indicated by the broken lines in FIG. 7. Incidentally, these linear contact portions form an overall mesh shape, as shown in FIG. 7.

The muffler 2 is completed by attaching the end plates 6 and 8, the gas intake pipe 10, and the gas discharge pipe 12 to the outer pipe 4 fitted with the inner pipe 14 in this way. The muffler 2 having this kind of structure is used as an exhaust pipe of an internal combustion engine, for example.

Figure 8:
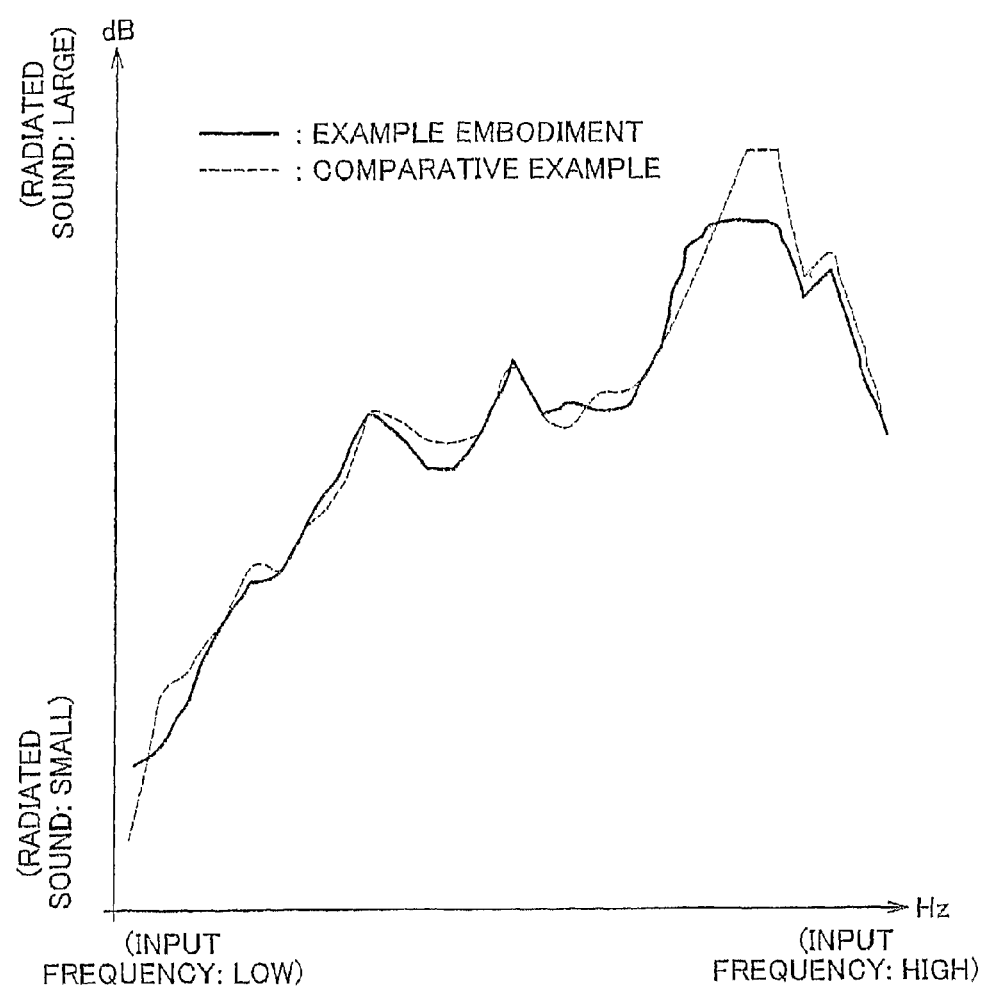
FIG. 8 is a graph of the measured radiated sound in the muffler according to the first example embodiment.

FIG. 8 is a graph of the measured radiated sound in the muffler 2 according to this example embodiment. Sound pressure was applied to the inside of the muffler 2 while changing the frequency (Hz) input from the speaker, and the sound pressure (dB) of the radiated sound was measured at a location away from the side surface of the muffler 2.

Moreover, as a comparative example, radiated sound was also measured with a muffler in which the outer pipe 4 is the same except for that a completely circular cylindrical inner pipe is used instead of the PCCP shell, and the outer peripheral surface of the inner pipe contacts the inner peripheral surface 4a of the outer pipe 4 along almost the entire surface.

As indicated by the solid line in FIG. 8, with the muffler 2 according to this example embodiment, the radiated sound is effectively reduced compared with the comparative example indicated by the broken line, at the frequency at which the high frequency side peak of the radiated sound is generated.

This mechanism is thought to be as follows. That is, the inner pipe 14 is a PCCP, shell, as shown in FIG. 5. Accordingly, the inner pipe 14 and the outer pipe 4 are in linear contact, as shown in FIG. 7. That is, the inner pipe 14 and the outer pipe 4 contact one another at the helical-shaped linear contact portions (i.e., the mesh-shaped contact portions) formed by the two edges RL1 and RL2 that twist in opposite directions and intersect one another. Therefore, the contact of the outer pipe 4 and the inner pipe 14 is a stable and one in which sliding occurs following sufficiently strong friction.

Moreover, as shown in FIG. 7, multiple spaces RS are formed by the linear contact portions, i.e., the edges RL1 and RL2, between the outer pipe 4 and the inner pipe 14. Therefore, when membrane oscillation occurs in the inner pipe 14, the oscillation energy is consumed by the volume fluctuation of these spaces RS, which is thought to make it possible to realize an even greater radiated sound reducing effect.

The first example embodiment described above is able to achieve the effects described below. (1) According to the mechanism described above, sliding with sufficiently strong friction force occurs, such that the pressure oscillation of the gas is absorbed by being converted into heat energy, and as a result, radiated sound is able to be effectively reduced. In this way, a sufficient radiated sound reducing effect from sliding can be realized with the simple structure in which the inner pipe 14 described above is arranged in the outer pipe 4.

Also, when the structure described above is used in an exhaust passage of an internal combustion engine and the outer pipe 4 serves as an exhaust pipe through which exhaust gas passes, a sufficient radiated sound reducing effect from sliding can be realized with a simple structure. Thus, this structure improves the productivity of the internal combustion engine and also helps to make the internal combustion engine lightweight.

(2) In particular, the portions of the inner pipe 14 that, contact the inner peripheral surface 4a of the outer pipe 4 spread out in a mesh shape, which allows sufficient sliding to occur between the outer pipe 4 and the inner pipe 14 during various types of oscillation such as axial oscillation and circumferential oscillation. Accordingly, the oscillation is effectively converted into heat, so a sufficient radiated sound reducing effect from sliding can be realized.

(3) Forming the inner pipe 14 in a polyhedron makes it possible to distribute the convex edges RL1 and RL2 over the surface of the inner pipe 14. Then arranging this inner pipe 14 fitted inside the outer pipe 4 enables the edges RL1 and RL2 to be placed in contact with the inner peripheral surface 4a of the outer pipe 4. The initial shape of the edges RL1 and RL2 between the faces (i.e., the triangular faces PT) that form the polyhedron is normally linear. However, by arranging the inner pipe 14 inside the outer pipe 4 by bending the edges RL1 and RL2 so that they follow the inner peripheral surface 4a of the outer pipe 4, the edges RL1 and RL2 of the polyhedron contact the inner peripheral surface 4a of the outer pipe 4 in a linear contact state in which they are able to slide with strong friction force.

Moreover, the polyhedron inner pipe 14 itself can be easily formed. In particular, the inner pipe of the PCCP shell can be easily manufactured by forming folds in circular cylindrical member. Therefore, the productivity of the inner pipe 14 is increased even more so the productivity of the muffler 2 is also increased.

Also, as described above, the multiple spaces RS are formed widely dispersed all over between the outer pipe 4 and the inner pipe 14, so a radiated sound reducing effect that is sufficiently high can be realized.

Figure 9A:
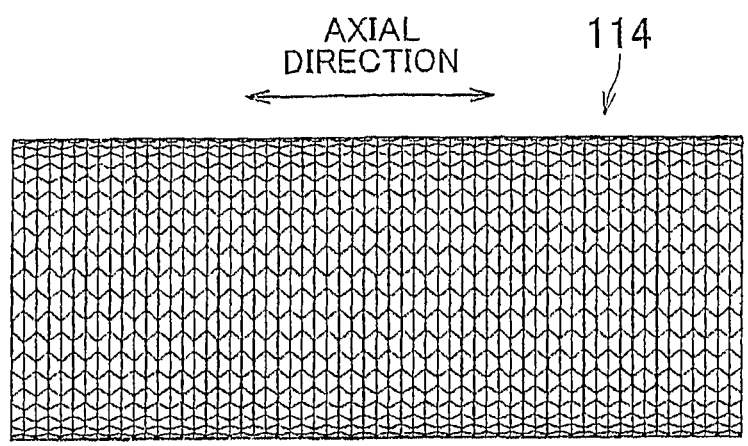
FIGS. 9A and 9B are views of a structure according to a second example embodiment of the invention.
Figure 9B:
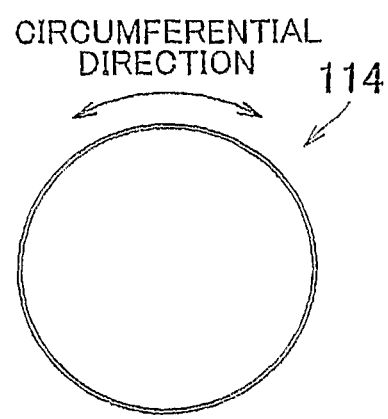
Figure 10:
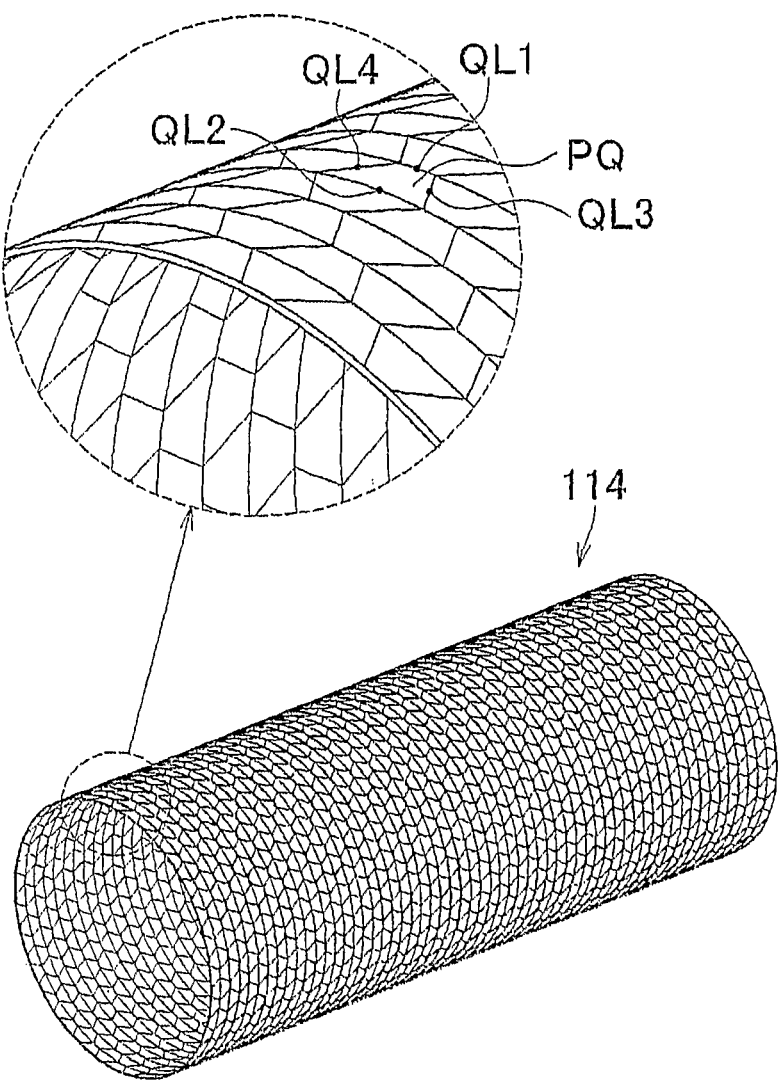
FIG. 10 is a partial enlarged perspective view of the inner pipe according to the second example embodiment.

Next, a second example embodiment of the invention will be described. In this second example embodiment, a inner pipe 114 is used as the inner pipe of the muffler, as shown in FIGS. 9A, 9B, and 10. FIG. 9A is a front view of the inner pipe 114, FIG. 9B is a side view of the inner pipe 114, and FIG. 10 is a perspective view of the inner pipe 114 and an enlarged view of a portion thereof. The other structure is similar to that of the first example embodiment described above. Incidentally, FIG. 11 is a perspective view of the inner pipe 114 fitted inside a, outer pipe 104 and an enlarged view of a portion thereof.

The inner pipe in the first example embodiment described above is a PCCP shell having triangular faces, while the inner pipe 114 in. this example embodiment is a PCCP shell having trapezoidal faces PQ. Each of these trapezoidal. faces PQ is surrounded by two parallel edges QL1 and QL2, and two non-parallel edges QL3 and QL4 that connect the end portions of those edges QL1 and QL2 together. The parallel edges QL1 and QL2 extend in the circumferential direction of the inner pipe 114, and extend in a ring shape around the inner pipe 114. The non-parallel edges QL3 and QL4 are arranged angled with respect to the axial direction of the inner pipe 114, and extending in a helical shape.

Of these edges, the edges QL1, QL3, and QL4 are convex portions in which the interplanar angle of the two trapezoidal faces PQ adjacent to each of those edges is greater than 180°. The edge QL2 is a convex portion in which the interplanar angle formed by two adjacent trapezoidal faces PQ is less than 180°.

Figure 11:
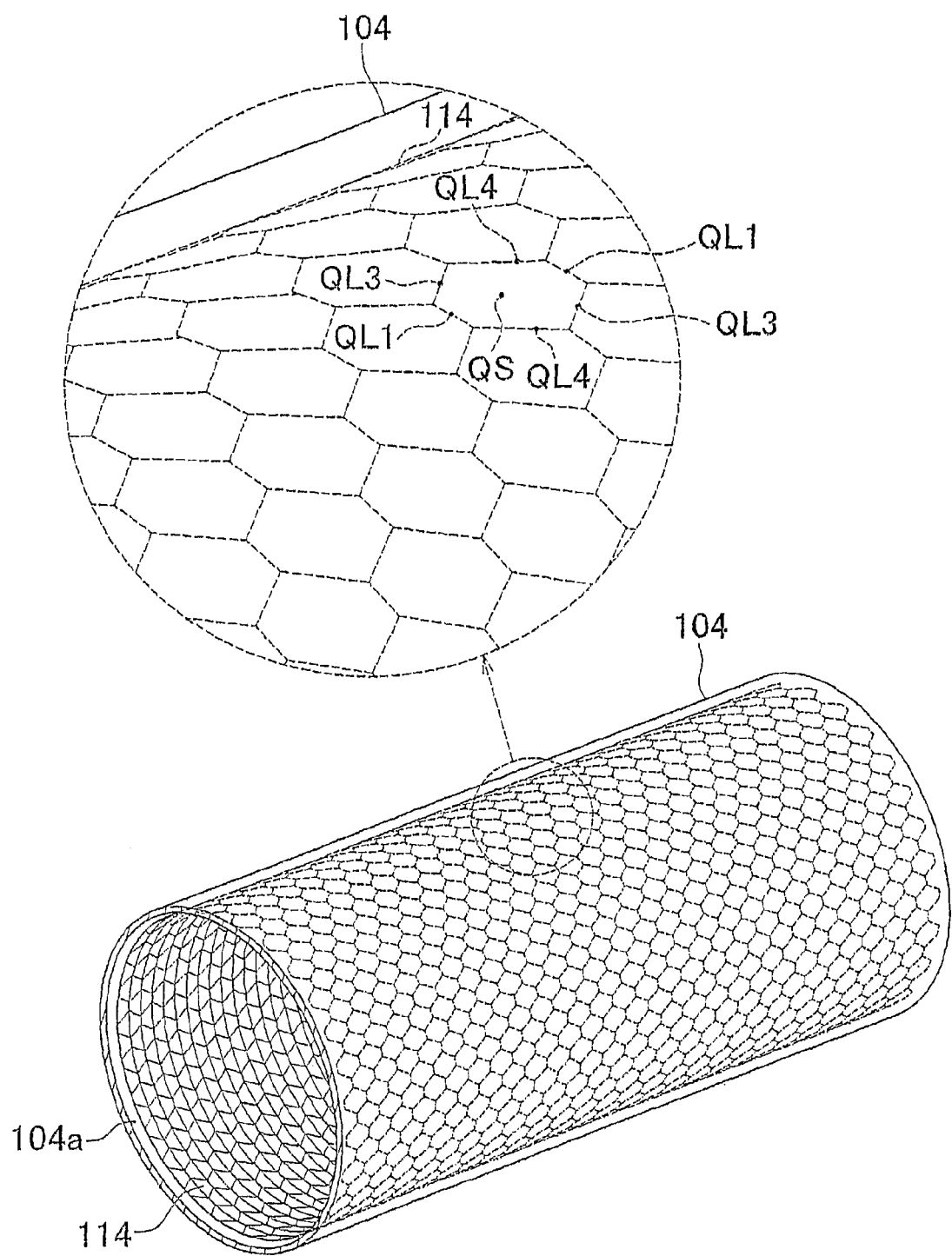
FIG. 11 is a view of the linear contact between the inner pipe and the outer pipe according to the second example embodiment.

Therefore, as shown by the broken lines in FIG. 11, when the inner pipe 114 is arranged . fitted inside the outer pipe 104, the edges QL1, QL3, and QL4 abut against the inner peripheral surface 104a of the outer pipe 104. In this case as well, the edges QL1, QL3, and QL4 that are formed as straight folds linearly contact the inner peripheral surface 104a along almost their entire lengths due to the edges QL1, QL3, and QL4 bending.

In the first example embodiment described above, two types of helical-shaped edges abut against the inner peripheral surface of the outer pipe. However, in this example embodiment, the edge QL1 aligned in a broken ring-shape in the circumferential direction of the outer pipe 104 and the two edges QL3 and QL4 that twist in opposite directions and are aligned in a broken helical shape in the axial direction of the outer pipe 104 abut against the inner peripheral surface 104a of the outer pipe 104. Incidentally, this kind of linear contact portion is an overall hexagonal mesh-shaped contact portion, as shown by the broken lines in FIG. 11. Further, multiple spaces QS that are surrounded by this mesh-shaped contact portion are formed between the outer pipe 104 and the inner pipe 114.

The same effects as those achieved by the first example embodiment are also achieved when the inner pipe 114 formed as a PCCP shell having these kinds of trapezoidal faces PQ is used.

Figure 12:
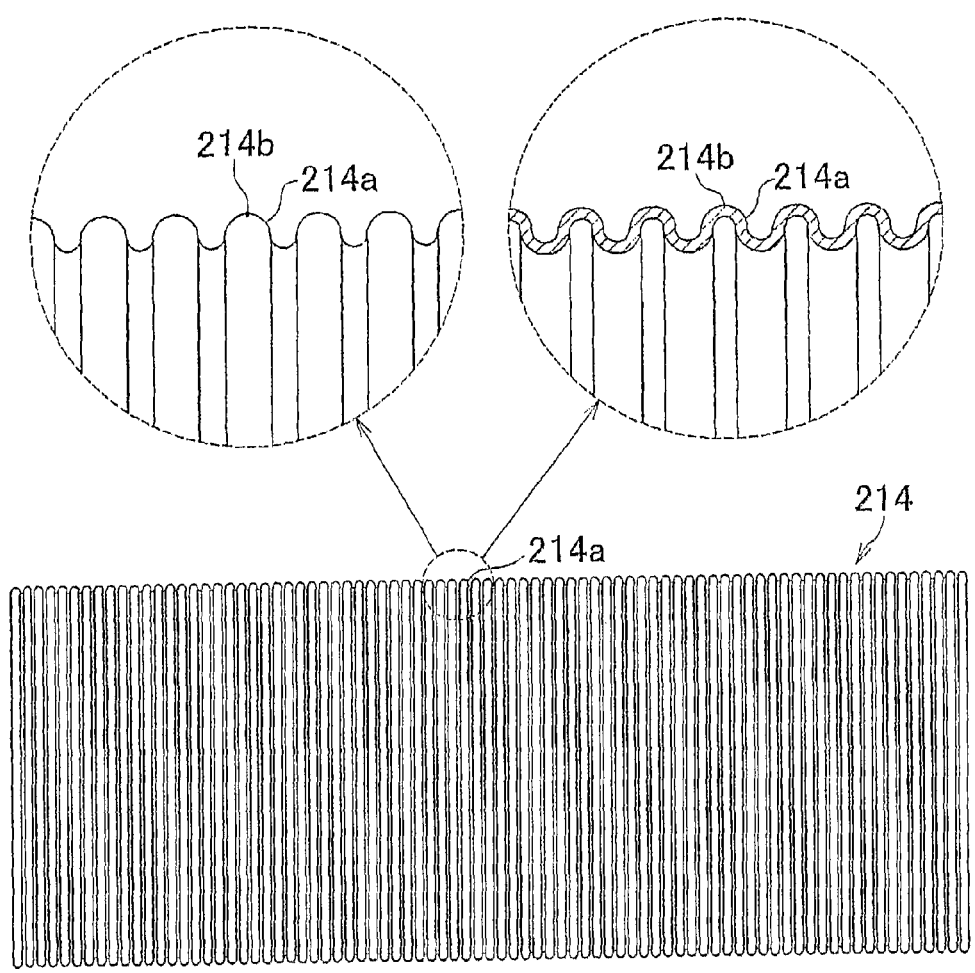
FIG. 12 is a partial enlarged and partially cut-away view of a inner pipe according to a third example embodiment of the invention.
Figure 13A:
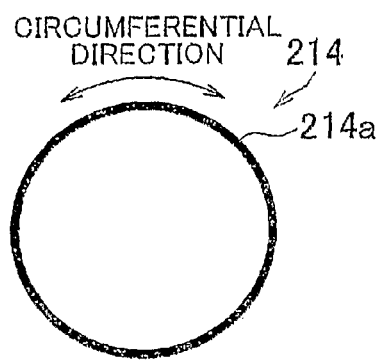
FIGS. 13A and 13B are views of the structure of inner pipe according to the third example embodiment.
Figure 13B:
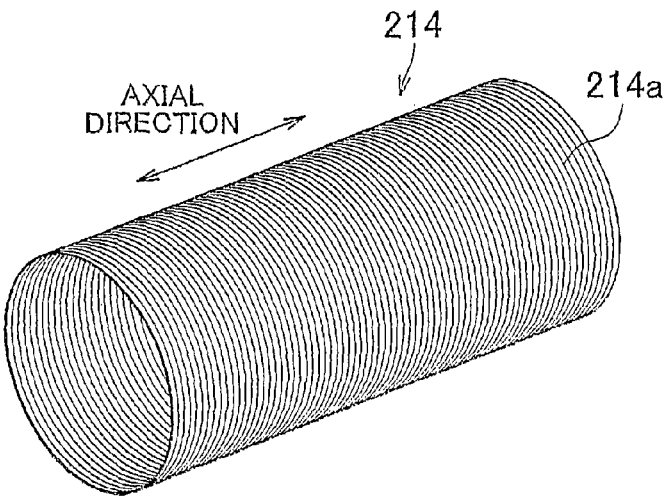
Figure 14:
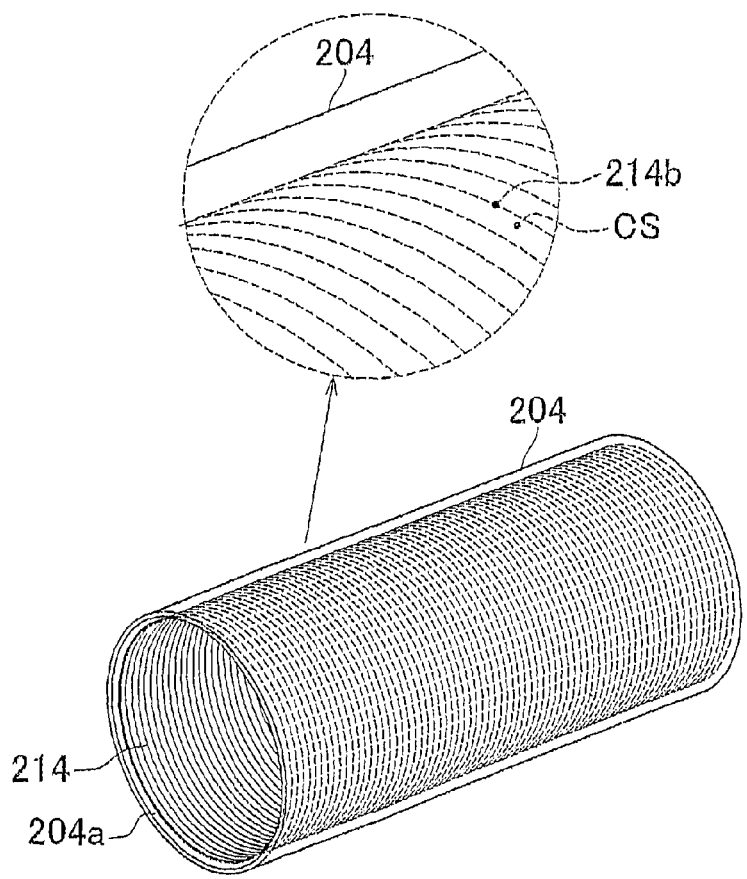
FIG. 14 is a view of the linear contact between the inner pipe and the outer pipe according to the third example embodiment.

Next, a third example embodiment of the invention will be described. In this example embodiment, a inner pipe 214 is used as the inner pipe of the muffler, as shown in FIGS. 12, 13A, and 13B. FIG. 12 is a front view of the inner pipe 214, as well as a partial enlarged view and a partial fractured view of that inner pipe 214. FIG. 13A is a side view of the inner pipe 214, and FIG. 13B is a perspective view of the inner pipe 214. The other structure is similar to that of the first example embodiment described above. Incidentally, FIG. 14 is a perspective view showing the inner pipe 214 fitted inside a outer pipe 204, as well as an enlarged view of a portion thereof.

Here, a wall portion 214a of the inner pipe 214 is formed in a bellows shape in which the diameter in the axial direction changes cyclically. Also, as shown in FIG. 14, the inner pipe 214 is arranged inside the outer pipe 204, with a largest diameter portion 214b of the bellows-shaped wall portion 214a linearly contacting the inner peripheral surface 204a of the outer pipe 204 in a ring shape. In FIG. 14, the location where the largest diameter portion 214b contacts the inner peripheral surface 204a of the outer pipe 204 is indicated by the broken lines. As a result, multiple spaces ES that are lined up in the axial direction arc formed between the outer pipe 204 and the inner pipe 214 by two adjacent largest diameter portions 214b.

This third example embodiment is able to achieve the effects described below. (1) By forming the outer peripheral surface in a bellows shape, the inner pipe 214 is arranged inside the outer pipe 204, slidably contacting the inner peripheral surface 204a at the ring-shaped linear contact portion. As a result, the ring-shaped contact portion that contacts the inner peripheral surface 204a of the inner pipe 204 oscillates due to the pressure oscillation of the gas oscillating the inner pipe 214, so strong friction force sliding can easily occur. The pressure oscillation of the gas is absorbed by being converted into heat energy by the friction during this sliding, such that a radiated sound reducing effect is realized. In this way, a sufficient radiated sound reducing effect from sliding can be realized with a simple structure in which the bellows-shaped inner pipe 214 described above is arranged inside the outer pipe 204.

Moreover, as described above, the multiple spaces CS that are lined up in the axial direction are formed between the outer pipe 204 and the inner pipe 214. Therefore, when membrane oscillation occurs in the inner pipe 214, the oscillation energy is consumed by the volume fluctuation of these spaces CS, which makes it possible to realize an even greater radiated sound reducing effect.

Also, when the structure described above is used in an exhaust passage. of an internal combustion engine and the outer pipe 204 serves as an exhaust pipe through which exhaust gas passes, a sufficient radiated sound reducing effect from sliding can be realized with a simple structure. Thus, this structure improves the productivity of the internal combustion engine and also helps to make the internal combustion engine lightweight.

Figure 15A:
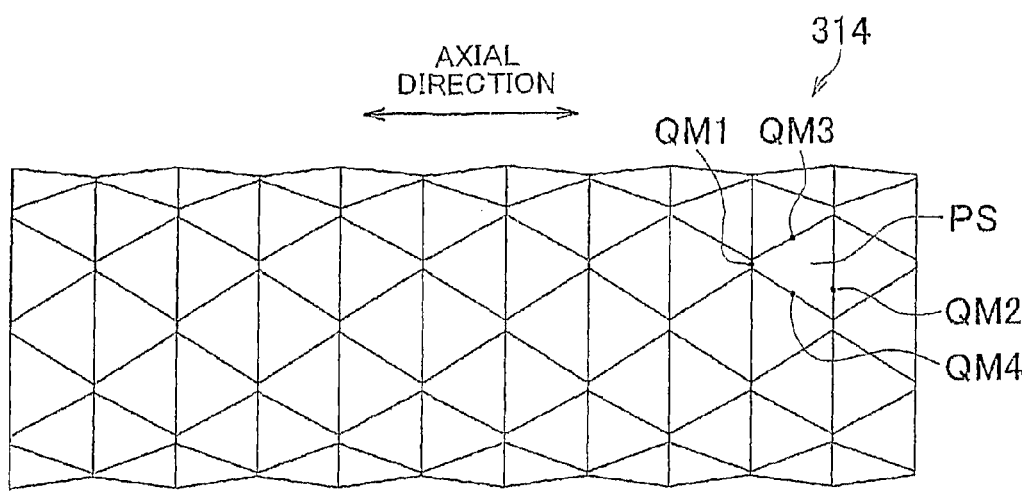
FIGS. 15A and 15B are views of the. structure of a inner pipe according to a fourth example embodiment of the invention.
Figure 15B:
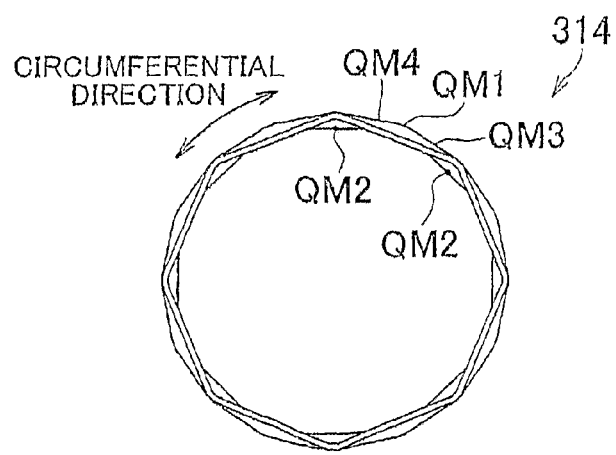
Figure 16:
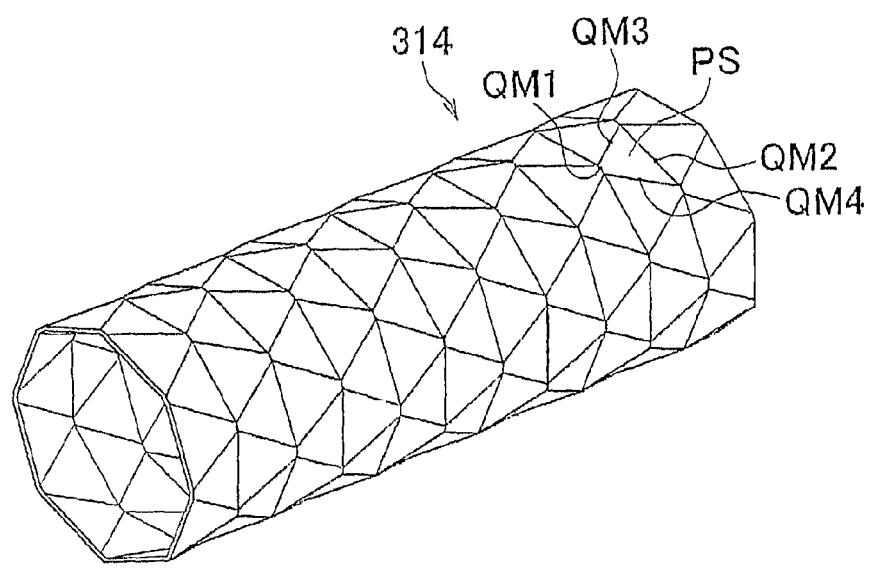
FIG. 16 is a perspective view of the inner pipe according to the fourth example embodiment.

Next, a fourth example embodiment of the example embodiment will be described. In this example embodiment, a inner pipe 314 is a PCCP shell with trapezoidal faces PS, as shown in FIGS. 15A, 15B, and 16. The other structure is similar to that of the first example embodiment described above. FIG. 15A is a front view of the inner pipe 314, FIG. 15B is a side view of the inner pipe 314, and FIG. 16 is a perspective view of the inner pipe 314. Incidentally, FIG. 17 is a perspective view showing the inner pipe 314 arranged fitted inside a outer pipe 304.

Of two parallel edges QM1 and QM2 of each trapezoidal face PS, one edge QM1 is much shorter than the other edge QM2. The other edges QM3 and QM4 that are not parallel are approximately the same length as the edge QM2.

Figure 17:
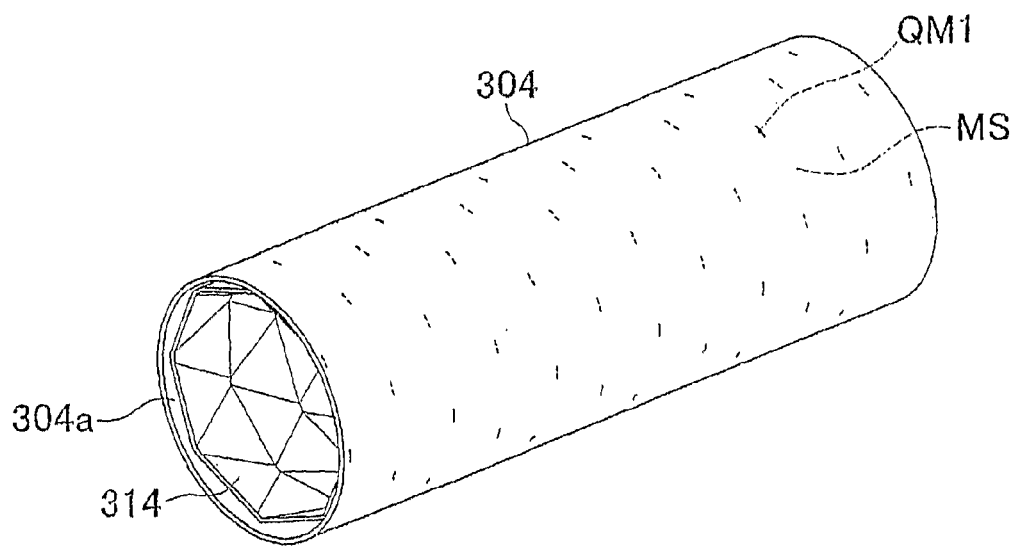
FIG. 17 is a view of the point contact between the inner pipe and the outer pipe according to the fourth example embodiment.

Therefore, when the inner pipe 314 is arranged fitted inside the outer pipe 304, only the shortest edge QM1 is dispersed over, and in point contact with, an inner peripheral surface 304a of the outer pipe 304, as shown by the broken lines in FIG. 17. That is, the point contact portions of the inner pipe 314 are distributed over the entire inner peripheral surface 304a of the outer pipe 304.

Incidentally; with the inner pipe 314 of the PCCP shell formed of completely triangular faces in which the length of the edge QM1 is 0, total point contact portions can be distributed over the entire inner peripheral surface 304a of the outer pipe 304.

This fourth example embodiment is able to achieve the effects described below. (1) As described above, the inner pipe 314 is arranged fitted in a slidable manner contacting the inner peripheral surface 304a of the outer pipe 304 at the point contact portions on the outer peripheral surface. As a result, the contact portion that contacts the inner peripheral surface 304a of the outer pipe 304 at points that are widely distributed oscillates due to the pressure oscillation of the gas oscillating the inner pipe 314, so strong friction force sliding can easily occur. In this way, the pressure oscillation of the gas is efficiently converted into heat energy, so radiated sound can be even more effectively reduced from sliding, as described in the first example embodiment above.

Moreover, the inner pipe 314 is a polyhedron (i.e., a PCCP shell in this case), so the multiple spaces MS due to the concavo-convex outer peripheral surface of the inner pipe 314 are formed widely dispersed all over. Therefore, when membrane oscillation occurs in the inner pipe 314, the oscillation energy is consumed by the volume fluctuation of these spaces MS. Further, the area covered by these spaces MS between the inner pipe 314 and the outer pipe 304 is large so oscillation is not easily transmitted from the inner pipe 314 to the outer pipe 304. As a result, the radiated sound reducing effect is able to be even greater.

Moreover, this kind of polyhedral inner pipe 314 itself can also be formed easily, which increases productivity even more. Productivity also increases because the inner pipe 314 of the PCCP shell can be completed by forming folds formed in the circular cylindrical member, in particular.

Also, when the structure described above is used in an exhaust passage of an internal combustion engine and the outer pipe 304 serves as an exhaust pipe through which exhaust gas passes, a sufficient radiated sound reducing effect from sliding can be realized with a simple structure. Thus, this structure improves the productivity of the internal combustion engine and also helps to make the internal combustion engine lightweight.

Figures 18A, 18B:
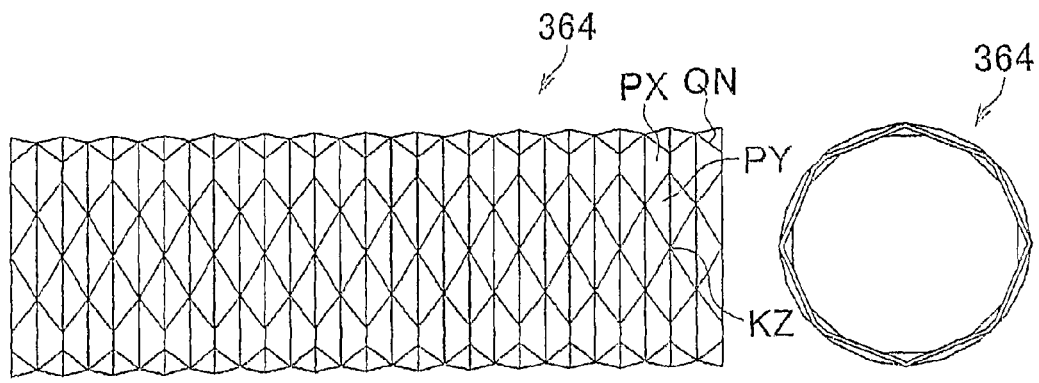
FIGS. 18A to 18C are views of the structure of a inner pipe according to a fifth example embodiment of the invention.
Figure 18C:
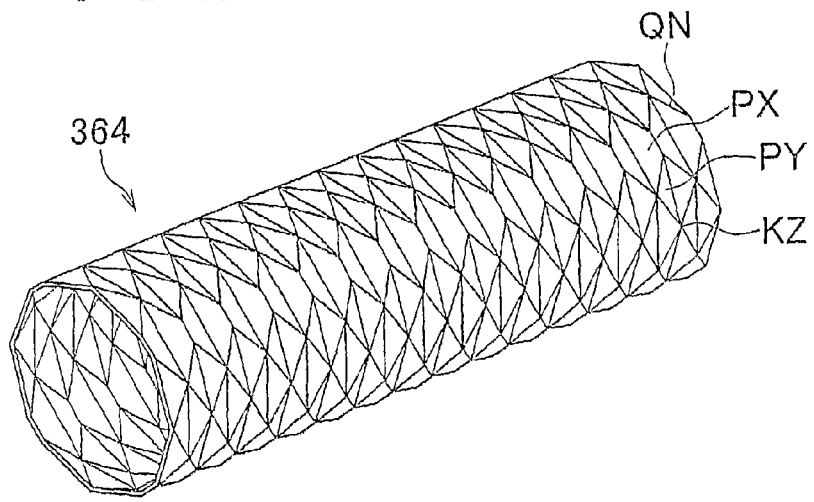
Figure 19:
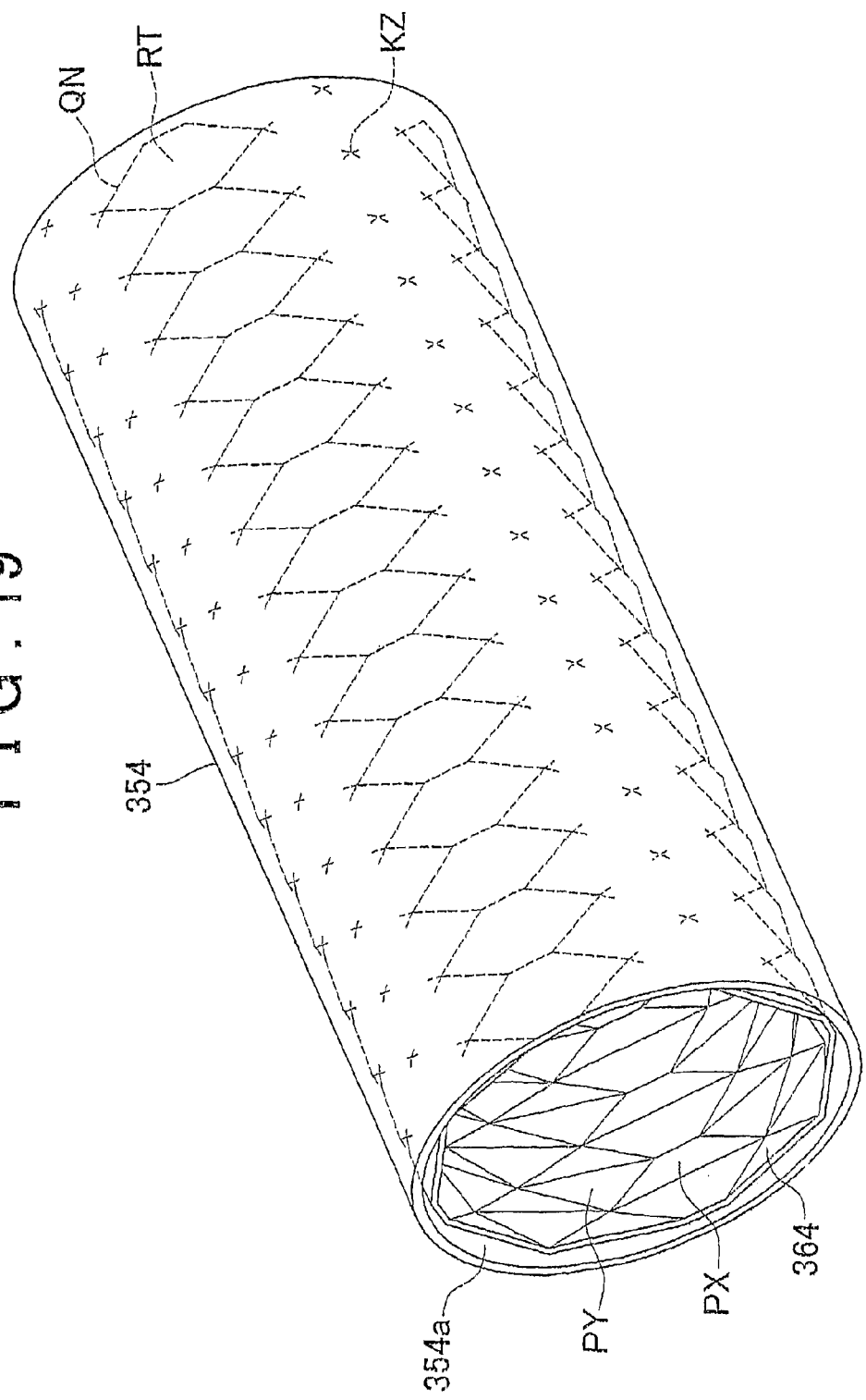
FIG. 19 is a view of the mixed linear contact and point contact between the inner pipe and the outer pipe according to the fifth example embodiment.

Next, a fifth example embodiment of the invention will be described. As shown in FIGS. 18A to 18C, a inner pipe 364 of this example embodiment is a PCCP shell having trapezoidal faces PX and triangular faces PY. The other structure is similar to that of the first example embodiment described above. FIG. 18A is a front View of the inner pipe 364, FIG. 18B is a side view of the inner pipe 364, and FIG. 18C is a perspective view of the inner pipe 364. FIG. 19 is a perspective view showing the inner pipe 364 arranged fitted inside of a outer pipe 354.

When the inner pipe 364 is arranged fitted inside of the outer pipe 354, an edge QN that forms part of each trapezoidal face PX contacts an inner peripheral surface 354a of the outer pipe 354 at a hexagonal linear contact portion, as shown by the broken lines in FIG. 19. Multiple hexagonal spaces RT are formed between the inner pipe 364 and the outer pipe 354 by this edge QN.

Furthermore, an apex KZ in a position surrounded by the triangular faces PY is in point contact with the inner peripheral surface 354a of the outer pipe 354. In this way, the linear contact portions and the point contact portions of the inner pipe 364 are distributed in a mixed manner over the entire inner peripheral surface 354a of the outer pipe 354.

This fifth example embodiment is able to achieve the same effects as those achieved by the second example embodiment and the fourth example embodiment described above.

Next, modified examples of the embodiments of the invention will be described. The polyhedron is not limited to the PCCP shell described in the first, second, fourth, and fifth example embodiments. That is, the polyhedron may have another shape instead.

Figure 20A:
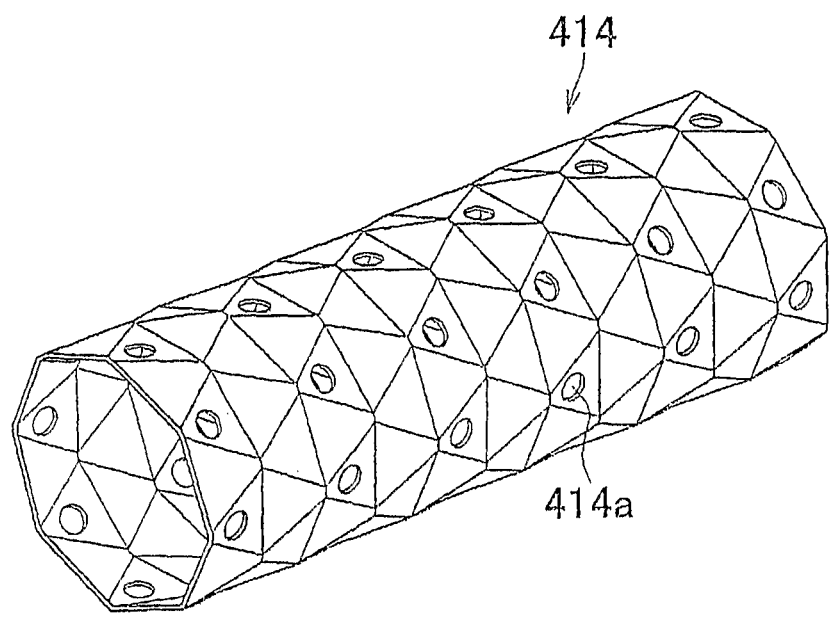
FIGS. 20A and 20B are views of the structure of a modified example of the embodiments of the invention.
Figure 20B:
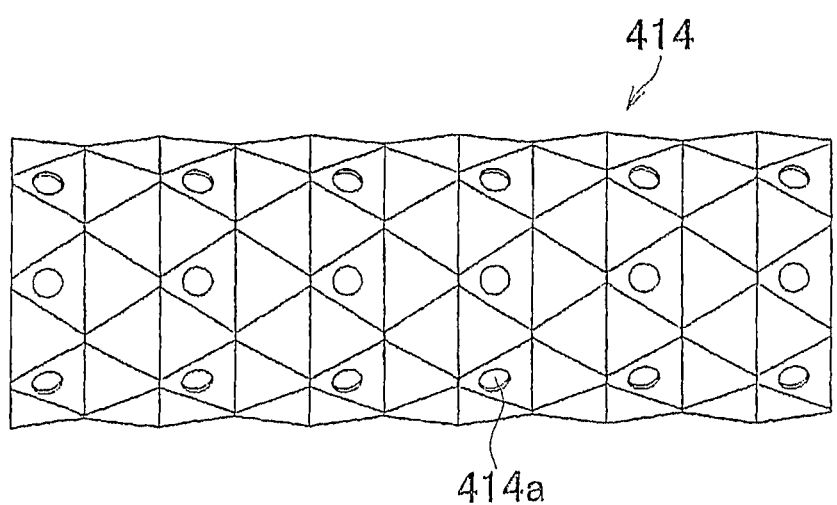

In the third example embodiment described above, a bellows-shaped circular cylindrical inner pipe is fitted to the outer pipe, but a bellows-shaped square inner pipe may also be fitted to the outer pipe. In the example embodiments described above, through-holes that communicate the center side surface of the inner pipe with the outer pipe side surface of the inner pipe may also he formed in the inner pipe, such that the space between the outer pipe and the inner pipe is connected to the space inside the inner pipe. For example, through-holes 414a may be formed in a inner pipe 414, as shown in FIGS. 20A and 20B. FIG. 20A is a perspective view of the inner pipe 414 and FIG. 20B is a front view of the inner pipe 414.

In the example embodiments described above, a muffler having a two-layer structure in which a inner pipe is arranged fitted to a outer pipe is given as an example. Alternatively, however, the muffler may have a four-layer structure or a six or more-layer structure. Also, a circular cylindrical pipe similar to the. outer pipe may be arranged inside the inner pipe of the example embodiments described above, and through-holes may be formed in this circular cylindrical pipe.

The invention claimed is:

1. A radiated sound reducing structure that reduces radiated sound generated in a pipe through which gas flows, comprising:
   a first pipe;
   a second pipe located inside of the first pipe;
   the second pipe is formed in a polyhedron;
   a first portion of an outer peripheral surface of the second pipe makes linear contact with a first portion of an inner peripheral surface of the first pipe, the linear contact portion of the outer peripheral surface of the second pipe is an edge of the polyhedron, and
   second portion of the outer peripheral surface of the second pipe makes point contact with a second portion of the inner peripheral surface of the first pipe.

2. The radiated sound reducing structure according to claim 1, wherein the outer peripheral surface of the second pipe is formed from a plurality of polygonal faces.

3. The radiated sound reducing structure according to claim 1, wherein the polyhedron is a pseudo-cylindrical concave polyhedral shell.

4. The radiated sound reducing structure according to claim 3, wherein the second pipe is the pseudo-cylindrical concave polyhedral shell which is a polyhedron shaped by combinations of triangular faces or trapezoidal faces with concavo-convex folds as sides.

5. The radiated sound reducing structure according to claim 1, wherein the gas is exhaust gas from an internal combustion engine.

6. The radiated sound reducing structure according to claim 1, wherein a space is formed between the inner peripheral surface of the first pipe and the outer peripheral surface of the second pipe.

7. The radiated sound reducing structure according to claim 6, wherein the second pipe has a through-hole that communicates the space with the inside of the second pipe.

8. A radiated sound reducing structure that reduces radiated sound generated in a pipe through which gas flows, comprising:
   a first pipe; and a second pipe formed in a polyhedron that is located inside of the first pipe, a portion of an outer peripheral surface of the second pipe contacts a portion of an inner peripheral surface of the first pipe.

9. The radiated sound reducing structure according to claim 8, wherein the polyhedron is a pseudo-cylindrical concave polyhedral shell.

10. The radiated sound reducing structure according to claim 8, wherein a space is formed between the inner peripheral surface of the first pipe and the outer peripheral surface of the second pipe.

11. The radiated sound reducing structure according to claim 10, wherein the second pipe has a through-hole that communicates the space with the in inside of the second pipe.

12. The radiated sound reducing structure according to claim 8, wherein the outer peripheral surface of the second pipe is formed from a plurality of polygonal faces.

13. The radiated sound reducing structure according to claim 9, wherein the second pipe is the pseudo-cylindrical concave polyhedral shell which is a polyhedron shaped by combinations of triangular faces or trapezoidal faces with concavo-convex folds as sides.

14. The radiated sound reducing structure according to claim 8, wherein the gas is exhaust gas from an internal combustion engine.

15. A radiated sound reducing structure that reduces radiated sound generated in a pipe through which gas passes, comprising:

a first pipe;

a second pipe located inside of the first pipe;

the second pipe is a pseudo-cylindrical concave polyhedral shell;

a portion of an outer peripheral surface of the second pipe makes point contact with a portion of an inner peripheral surface of the first pipe.

16. The radiated sound reducing structure according to claim 15, wherein the gas is exhaust gas from an internal combustion engine.

17. The radiated sound reducing structure according to claim 15, wherein a space is formed between the inner peripheral surface of the first pipe and the outer peripheral surface of the second pipe.

18. The radiated sound reducing structure according to claim 17, wherein the second pipe has a through-hole that communicates the space with the inside of the second pipe.

19. The radiated sound reducing structure according to claim 15, wherein the second pipe is the pseudo-cylindrical concave polyhedral shell which is a polyhedron shaped by combinations of triangular faces or trapezoidal faces with concavo-convex folds as sides.

* * * * *